(12) United States Patent
Shin (10) Patent No.: US 9,925,898 B2
(45) Date of Patent: Mar. 27, 2018

(54) CONSOLE ARMREST FOR VEHICLE

(71) Applicants: Hyundai Motor Company, Seoul (KR); Kia Motors Corporation, Seoul (KR)

(72) Inventor: Hoon Sup Shin, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 14/887,089

(22) Filed: Oct. 19, 2015

(65) Prior Publication Data

US 2017/0015225 A1      Jan. 19, 2017

(30) Foreign Application Priority Data

Jul. 13, 2015   (KR) .................... 10-2015-0099196

(51) Int. Cl.
*B60N 2/46*      (2006.01)
*B60R 11/02*     (2006.01)
*B60R 11/00*     (2006.01)

(52) U.S. Cl.
CPC ......... *B60N 2/4686* (2013.01); *B60N 2/4626* (2013.01); *B60N 2/4633* (2013.01); *B60R 11/0235* (2013.01); *B60R 2011/0007* (2013.01)

(58) Field of Classification Search
CPC ...... B60N 2/4686; B60N 2/4633; B60R 7/04; B69N 2/4606
USPC ........................................................ 296/37.8
See application file for complete search history.

(56) References Cited

U.S. PATENT DOCUMENTS

| 5,836,496 | A | * | 11/1998 | Levin | ................ | B60R 11/0241 |
| | | | | | | 224/275 |
| 5,996,866 | A | * | 12/1999 | Susko | ................ | B60R 11/0241 |
| | | | | | | 224/281 |
| 6,616,205 | B2 | * | 9/2003 | Bruhnke | ................ | B60R 7/04 |
| | | | | | | 224/275 |
| 6,663,155 | B1 | * | 12/2003 | Malone | ................ | B60R 11/0229 |
| | | | | | | 224/539 |
| 6,851,736 | B1 | * | 2/2005 | Klopp, III | ................ | B60R 7/04 |
| | | | | | | 224/926 |
| 7,413,229 | B2 | * | 8/2008 | Kukucka | ................ | B60N 2/4646 |
| | | | | | | 296/1.09 |
| 7,469,951 | B2 | * | 12/2008 | Welschholz | ................ | B60R 7/06 |
| | | | | | | 296/37.12 |
| 7,581,774 | B2 | * | 9/2009 | Abro | ................ | B60R 7/04 |
| | | | | | | 296/24.34 |

(Continued)

FOREIGN PATENT DOCUMENTS

| JP | 2007-30840 A | 2/2007 |
| JP | 2007-62462 A | 3/2007 |
| KR | 10-2012-0047571 A | 5/2012 |

*Primary Examiner* — Pinel E Romain
(74) *Attorney, Agent, or Firm* — Morgan, Lewis & Bockius LLP (57) ABSTRACT

A console armrest for a vehicle may include a cover device configured to selectively cover a console box and coupled to the console box to be rotatable, an upper support device connected to the cover device to be rotatable in an up and down direction of the vehicle, and a lower support device configured to be drawn out from the cover device to a rear side, in which when the lower support device is drawn out from the cover device, a support space may be formed between the lower support device and the cover device.

15 Claims, 9 Drawing Sheets

(56) References Cited

U.S. PATENT DOCUMENTS

| | | | | |
|---|---|---|---|---|
| 7,708,328 | B2* | 5/2010 | Doom | B60R 7/06 |
| | | | | 206/565 |
| 8,172,293 | B2* | 5/2012 | Lota | B60R 11/02 |
| | | | | 224/483 |
| 8,714,613 | B1* | 5/2014 | Gillis | B60R 7/04 |
| | | | | 296/24.34 |
| 9,038,842 | B2* | 5/2015 | Doll | B60R 7/06 |
| | | | | 220/264 |
| 9,156,407 | B1* | 10/2015 | Kramer | B60R 7/04 |
| 2005/0189776 | A1* | 9/2005 | Sturt | B60N 3/107 |
| | | | | 296/24.34 |
| 2005/0230993 | A1* | 10/2005 | Dry | B60N 2/4606 |
| | | | | 296/37.8 |
| 2006/0066118 | A1* | 3/2006 | Radu | B60R 7/04 |
| | | | | 296/37.8 |
| 2006/0071497 | A1* | 4/2006 | Radu | B60N 2/46 |
| | | | | 296/24.34 |
| 2006/0108816 | A1* | 5/2006 | Radu | B60N 2/4606 |
| | | | | 296/24.34 |
| 2009/0058120 | A1* | 3/2009 | Ioka | B60H 1/0055 |
| | | | | 296/24.34 |
| 2012/0061983 | A1* | 3/2012 | Seiller | B60R 11/00 |
| | | | | 296/24.34 |

* cited by examiner

CONSOLE ARMREST FOR VEHICLE

CROSS-REFERENCE TO RELATED APPLICATION

The present application claims priority to Korean Patent Application No. 10-2015-0099196 filed Jul. 13, 2015, the entire contents of which is incorporated herein for all purposes by this reference.

BACKGROUND OF THE INVENTION

Field of the Invention

The present invention relates to a console armrest for vehicle. More particularly, the present invention relates to the console armrest for vehicle where a display device may be assembled.

Description of Related Art

As handheld devices such as tablet personal computers (PC) are increasingly popularized, the handheld devices are being applied to the interior of vehicles.

However, when a user views an image on a portable display device, the user should continually hold the portable display device. Therefore, a cradle is required in order to view the image without holding the portable display device.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a console armrest for a vehicle such that a user can conveniently view an image of a portable display device.

According to various aspects of the present invention, a console armrest for a vehicle may include a cover device configured to selectively cover a console box and coupled to the console box to be rotatable, an upper support device connected to the cover device to be rotatable in an up and down direction of the vehicle, and a lower support device configured to be drawn out from the cover device to a rear side, in which when the lower support device is drawn out from the cover device, a support space may be formed between the lower support device and the cover device.

A portion of the lower support device being drawn out from the cover device may correspond to a rotation amount of the upper support device.

The console armrest may further include a first interlocking gear provided to the upper support device and formed in a rotation direction of the upper support device, a second interlocking gear provided to the lower support device and formed in a direction in which the lower support device is drawn out, and a cover device gear engaged to the first interlocking gear and the second interlocking gear together and configured to actuate the first interlocking gear and the second interlocking gear.

The upper support device may include a first interlocking bracket extended downward and provided with the first interlocking gear at one side surface thereof, and the lower support device may include a second interlocking bracket which is extended in a length direction of the vehicle and is provided with the second interlocking gear at one side surface thereof.

The first interlocking bracket may be formed in an arc shape rounded with reference to the rotation center of the upper support device.

The second interlocking bracket may include a pair of interlocking brackets, and a portion of the first interlocking bracket may be disposed between the pair of second interlocking brackets.

The console upper support device may include an upper support device body configured to seat on a receiving groove formed at an upper surface of the cover device as one side end thereof is rotatably connected to the cover device, a sliding bracket configured to be drawn out from the upper support device body, and an upper hold portion rotatably connected to an end portion of the sliding bracket and provided with an upper hold groove which faces downward.

A receiving space may be hollowly formed at a lower surface of the upper support device body such that the sliding bracket is inserted therein and drawn out therefrom, and the receiving space may be formed from a front side to a rear side end at a lower surface of the upper support device body.

A sliding rail may protrude from left and right sides of the receiving space to inside of the receiving space and the sliding rail may be extended in the length direction of the upper support device body, in which a sliding groove configured to guide the sliding rail is disposed at left and right surfaces of the sliding bracket, and a stopper may be disposed at an end portion of the sliding groove.

The sliding bracket may include a locking portion having a plurality of blockers formed thereon, and a locking elastic member formed such that a first side thereof is fixed to the upper cover device body and a second side is configured to be hooked by at least one of the blockers.

The upper hold portion may include a connection bracket which is formed in a sphere shape, and an insertion hole may be rotatable with reference to the sliding bracket.

The upper support device may include a rotation shaft disposed at one side of the upper support device body and connected to the upper support device such that the upper support device rotates about the cover device, and a rotation shaft elastic member disposed at a radially outer portion of the rotation shaft and configured to apply elastic force such that the upper support device body is moved to the receiving groove of the cover device.

The lower support device may include a lower support device body to slide in the cover device, and a lower hold portion connected to the lower support device body in order to rotate with reference to a rotation shaft which is orthogonal to a direction in which the lower support device is sliding.

The lower hold portion may include a lower hold portion frame connected to the lower support device body and rounded such that both ends thereof face rearward, and a lower hold device which is disposed at both ends of the lower hold portion frame and provided with a lower hold groove which faces upward and is configured to selectively protrude to an outside of the cover device through a pair of sliding holes which are disposed at the cover device.

The lower support device body may include a lower support device gear configured to rotate about the second rotation shaft, and a frame gear may be engaged to the lower support device gear and formed at one surface of the lower hold portion frame.

The upper support device may be provided in order to selectively seat on a receiving groove formed at an upper surface of the cover device, and the lower support device may be selectively and completely inserted into an inside of the cover device.

According to the various embodiments, when the user views an image on the portable display device in the vehicle, the portable display device is conveniently assembled to the vehicle.

In addition, when the portable device is not held, a structure for holding the portable device may be put in the armrest. Thus, a sense of beauty of the inside of vehicle is improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
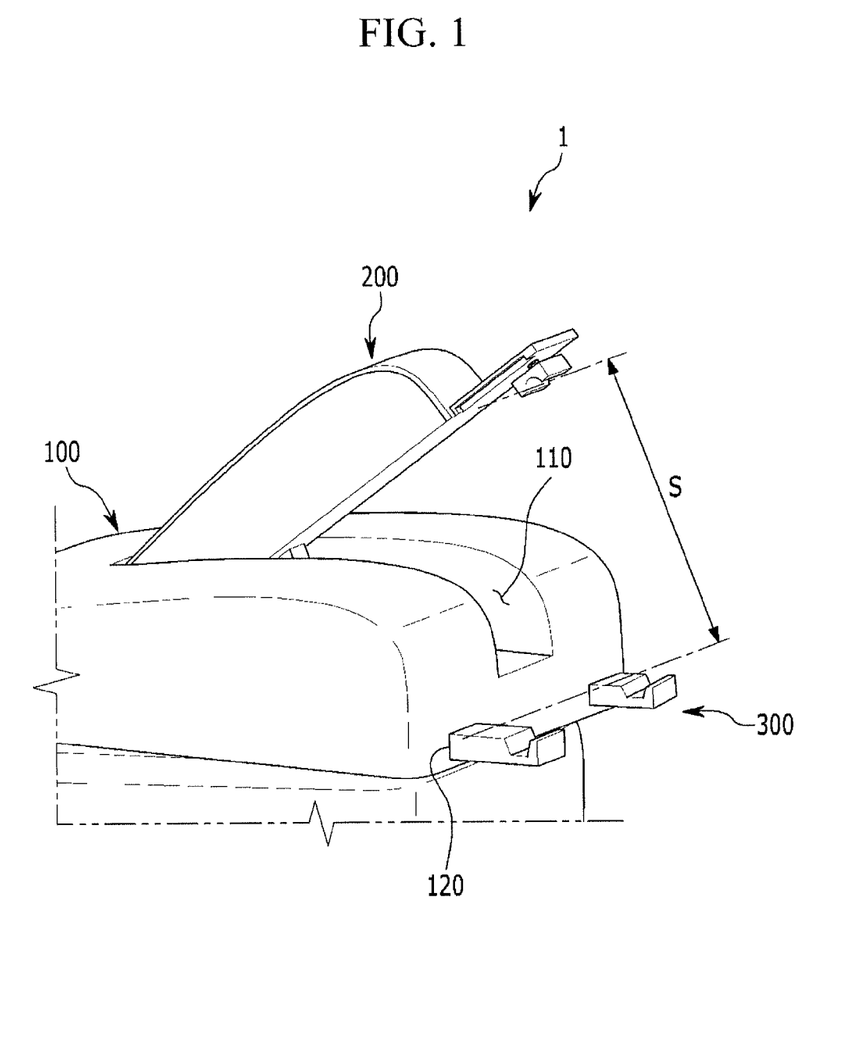
FIG. 1 is perspective view of an exemplary console armrest for vehicle according to the present invention.

FIG. 1 is perspective view of a console armrest for vehicle according to various embodiments of the present invention.

Referring to FIG. 1, a console box (900, see FIG. 5) is disposed between a driver seat and a passenger seat, and provides a storage space. A console armrest 1 is disposed on the console box 900 so as to selectively open and close the storage space. A driver may put his arm on the console armrest 1.

The console armrest 1 for a vehicle according to various embodiments of the present invention includes a cover device 100, an upper support device 200, and lower support device 300.

A cover device 100 is rotatably connected to the console box 900. The cover device 100 may selectively cover the console box 900 so as to selectively open and close the storage space. Also, the cover device 100 is configured to provide a space in order to put a user's arm thereon.

The upper support device 200 is connected to the cover device 100 to be rotatable and selectively seated on a receiving groove 110 which is formed at an upper surface of the cover device 100.

The lower support device 300 may be drawn out from the cover device 100 to rearward. In a state that a portion of lower support device 300 is drawn out, the portion of the lower support device 300 is disposed to be spaced apart from a portion of the upper support device 200. Therefore, a support space S for assembling a portable display device may be formed.

Hereinafter, detailed configurations of the console armrest 1 for a vehicle according to various embodiments will be described.

Figure 2:
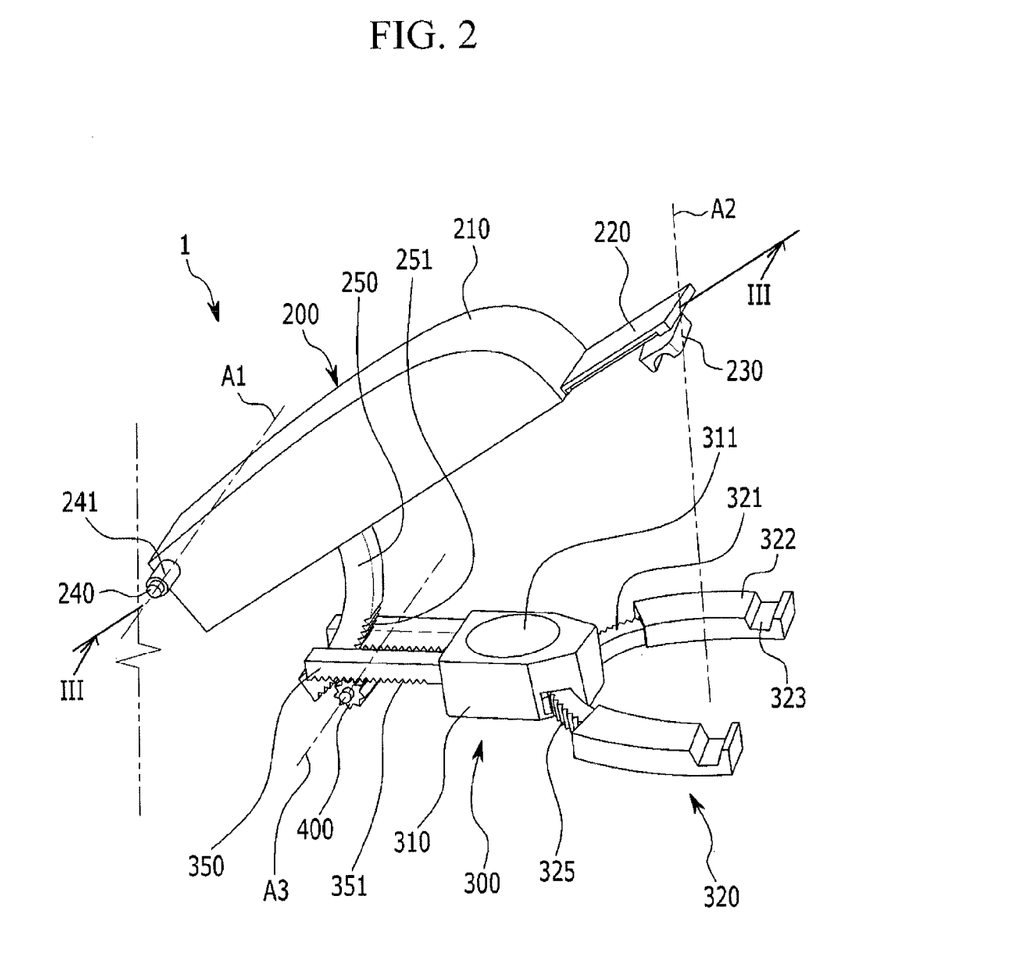
FIG. 2 is an exploded perspective view of the exemplary console armrest according to the present invention.
Figure 3:
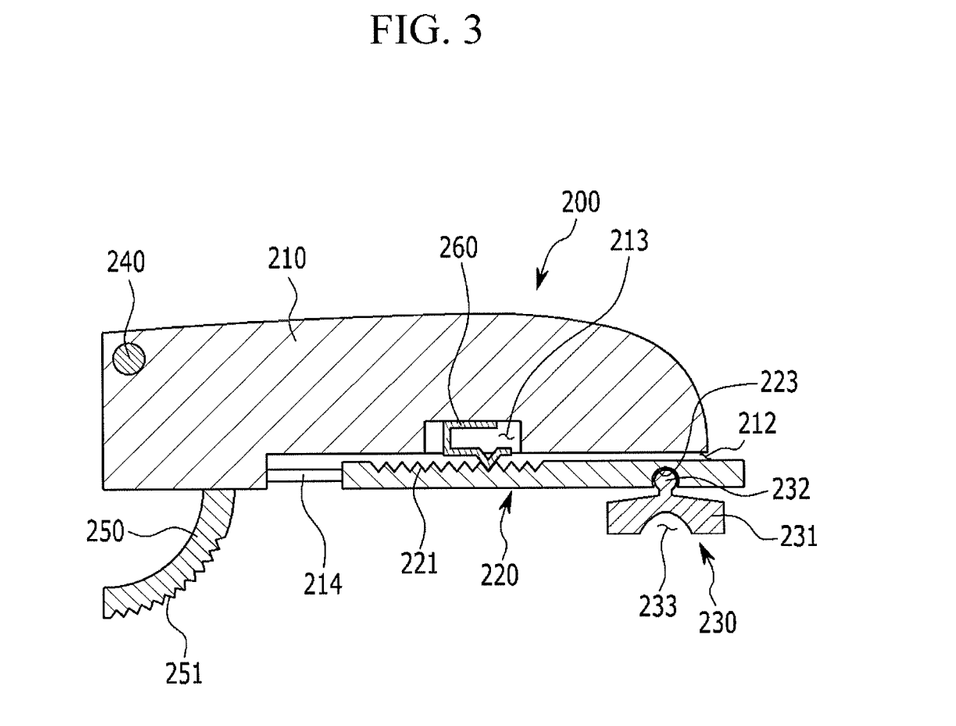
FIG. 3 is cross-sectional view along line III-III of FIG. 2.

FIG. 2 is an exploded perspective view of the console armrest according to various embodiments of the present invention, and FIG. 3 cross-sectional view along line III-III of FIG. 2.

Figure 4:
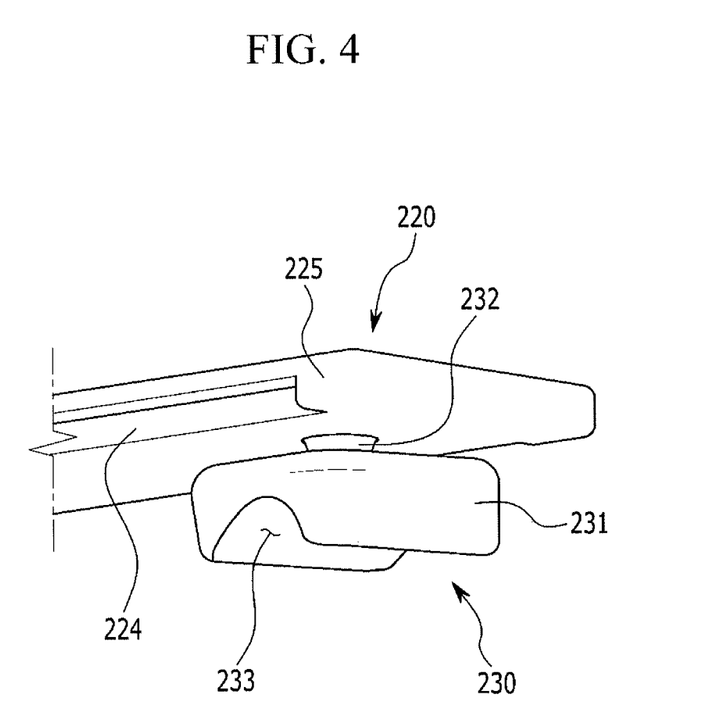
FIG. 4 is an enlarged view of a part of an upper support device of FIG. 1.

FIG. 4 is an enlarged view of a part of an upper support device of FIG. 1.

Referring to FIGS. 2 to 4, the upper support device 200 of the console armrest 1 includes an upper support device body 210, a sliding bracket 220, an upper hold portion 230, a rotation shaft 240, a first interlocking bracket 250, and a locking elastic member 260.

The upper support device body 210 may be seated on the receiving groove 110 formed at an upper surface of the cover device 100 as one side end thereof is rotatably connected to the cover device 100. The other side of the upper support device body 210 is disposed to face a rear side of the cover device 100.

The upper support device body 210 has a receiving space 212 formed at a lower surface thereof to be recessed upward. The receiving space 212 is extended one side of the lower surface of the upper support device body 210 to the other side end.

An elastic member receiving space 213 is formed at an upper side of the receiving space 212 to be further recessed from the receiving space 212.

A sliding rail 214 is formed at left and right sides of the receiving space 212. The sliding rail 214 is extended in a length direction of the receiving space 212, and is protruded from left and right sides of the receiving space 212 to inner side of the receiving space 212.

For example, the sliding bracket 220 may be formed in a plate shape, and is configured to insert in or draw out from the upper support device body 210.

The sliding bracket 220 is disposed in the upper support device body 210. An upper surface of sliding bracket 220 is provided with a locking portion 221 which has a plurality of blockers. In addition, left and right surfaces of the sliding bracket 220 have a sliding groove 224 so as to guide the sliding rail 214. The sliding groove has a stopper 225 which is disposed at the other side end thereof.

Moreover, an insertion hole 223 is formed at a lower surface of the sliding bracket 220 to be recessed upward and is adjacently positioned to the other end of the sliding bracket 220. The insertion hole 223 is connected to the upper hold portion 230 such that the upper hold portion 230 is rotatable.

For example, the locking elastic member 260 may be made of a metal material so as to apply elastic force, and is disposed in the elastic member receiving space 213.

A portion of the locking elastic member 260 is fixed to the upper support device body 210. The remaining portion of the locking elastic member 260 is hooked by one of the blockers formed at the locking portion 221. Thereby, in a state of non-external force, the sliding bracket 220 is stopped.

The upper hold portion 230 includes an upper hold portion body 231, and a connection bracket 232 which is disposed on an upper surface of the upper hold portion body 231 and is formed in a sphere shape.

A lower surface of the upper hold portion body 231 has an upper hold groove 233 which is concave.

A portion of the connection bracket 232 is inserted to the insertion hole 223 such that the upper hold portion 230 rotates around the sliding bracket 220.

Herein, the connection bracket 232 may be connected to the insertion hole 223 by a ball joint.

The rotation shaft 240 is disposed at one end of the upper support device 200 and is configured to rotate the cover device 100 around a first shaft A1.

In addition, the rotation shaft 240 includes a rotation shaft elastic member 241 which is formed at an external circumferential portion thereof. The rotation shaft elastic member 241 may provide elastic force such that the upper support device body 210 is moved to the receiving groove 110.

The first interlocking bracket 250 is extended downward at a lower surface of the upper support device body 210. The first interlocking bracket 250 may have a circular arc shape centering on the rotation shaft 240.

Also, the first interlocking bracket 250 has a first interlocking gear 251 which is disposed along one surface of the first interlocking bracket 250.

Meanwhile, the lower support device 300 may be selectively inserted into the inside of the cover device 100, and includes a lower support device body 310, a lower hold portion 320, and a second interlocking bracket 350.

The lower support device body 310 is provided to be slid forward and rearward in the space of the cover device 100. The lower support device body 310 includes a lower support device gear 311, and the lower support device gear 311 may be rotatable in a length direction of the vehicle.

The lower hold portion 320 includes a lower hold portion frame 321, and a pair of lower hold devices 322 which are disposed at the both ends of the lower hold portion frame 321.

The lower hold portion frame 321 is formed in a circular arc centering on a second rotation shaft A2, and both ends thereof face a rear side. The second rotation shaft A2 is configured to be orthogonal to a direction in which the lower support device body 310 is sliding.

Moreover, the lower hold portion frame 321 is connected to the lower support device body 310 to be slidable, and has a frame gear 325 which is engaged to the lower support device gear 311 at the one surface thereof.

Since the lower hold portion frame 321 which has a circular arc shape is connected to the lower support device body 310 to be slidable, the lower hold portion frame 321 may rotate around the second rotation shaft A2.

The lower hold device 322 has a lower hold groove 323 that is concaved downward, and the lower hold device 322 may be selectively protruded to an outside of the cover device 100 through a pair sliding holes 120 which are disposed at the cover device.

The second interlocking bracket 350 is extended from one end of the lower support device body 310 to the front side. The second interlocking bracket 350 has a second interlocking gear 351 which is formed at a lower surface thereof.

The second interlocking bracket 350 may be provided as a pair, and the first interlocking gear 251 may be disposed between a pair of the second interlocking brackets 350.

Meanwhile, the console armrest 1 for a vehicle according to various embodiments further includes a cover device gear 400. The cover device gear 400 is connected to the cover device 100 to be rotatable in the cover device 100, and is formed in a cylindrical shape having teeth at the exterior circumference thereof. The cover device gear 400 is engaged to the first interlocking gear 251 and the second interlocking gear 351 together. At this time, the cover device gear 400 is configured to be rotatable around a third rotation shaft A3 which is formed in a width direction of the vehicle.

The cover device gear 400 may be engaged to the first interlocking gear 251 and the second interlocking gear 351 together. Thereby, the upper support device 200 and the lower support device 300 may be moved.

Therefore, a portion of the lower support device 300 being drawn out from the cover device 100 may depend upon a rotation amount of the upper support device 200.

Hereinafter, an operation of the console armrest 1 for a vehicle according to various embodiments will be described.

Figure 5:
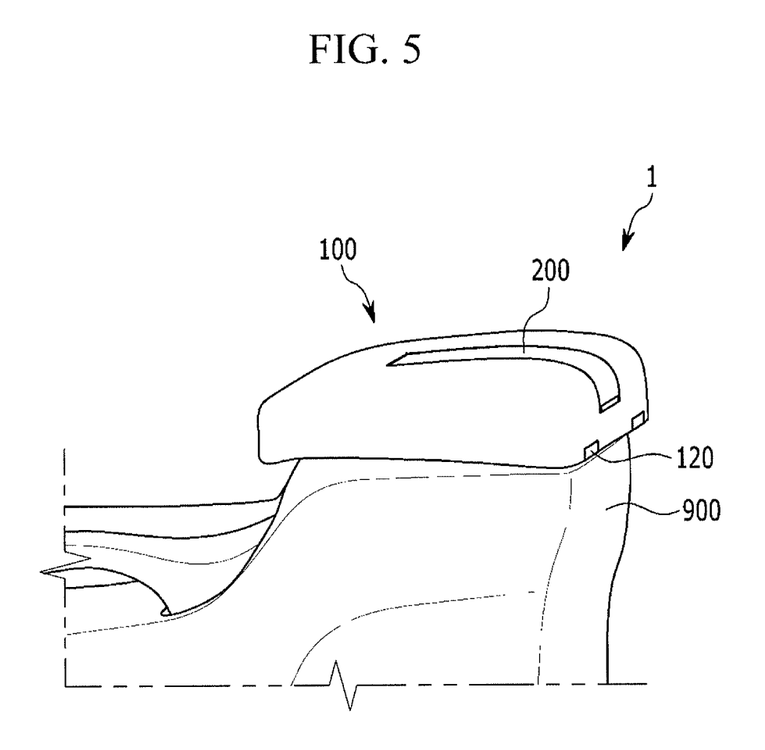
FIG. 5, FIG. 6, and FIG. 7 show an operating process of the exemplary console armrest for vehicle according to the present invention.
Figure 6:
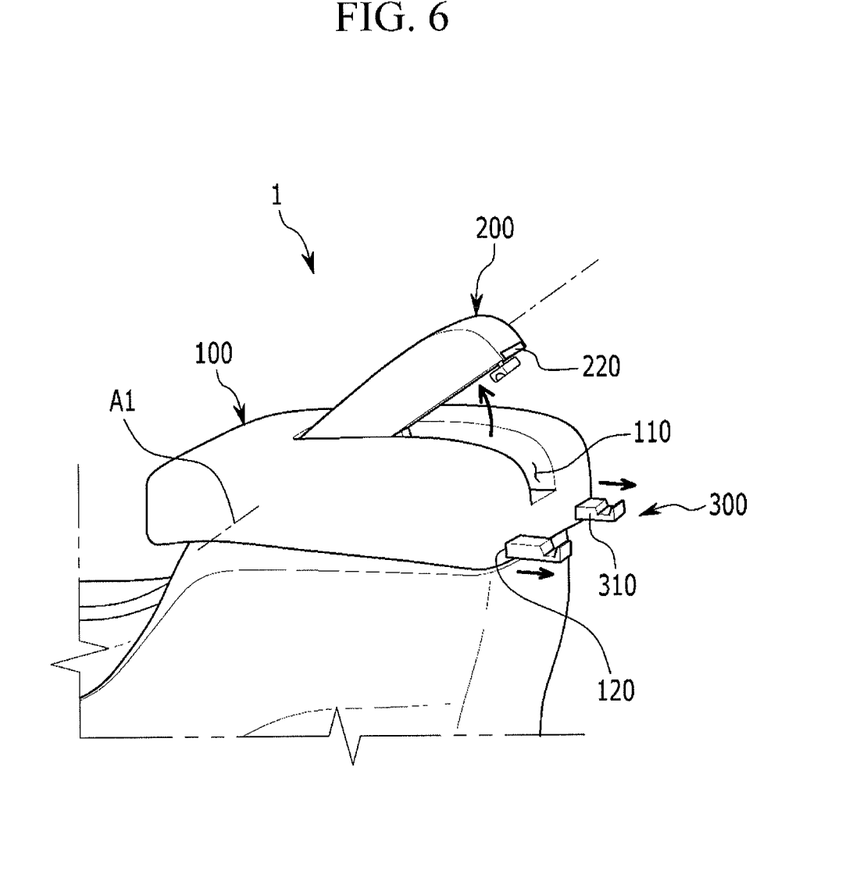
Figure 7:
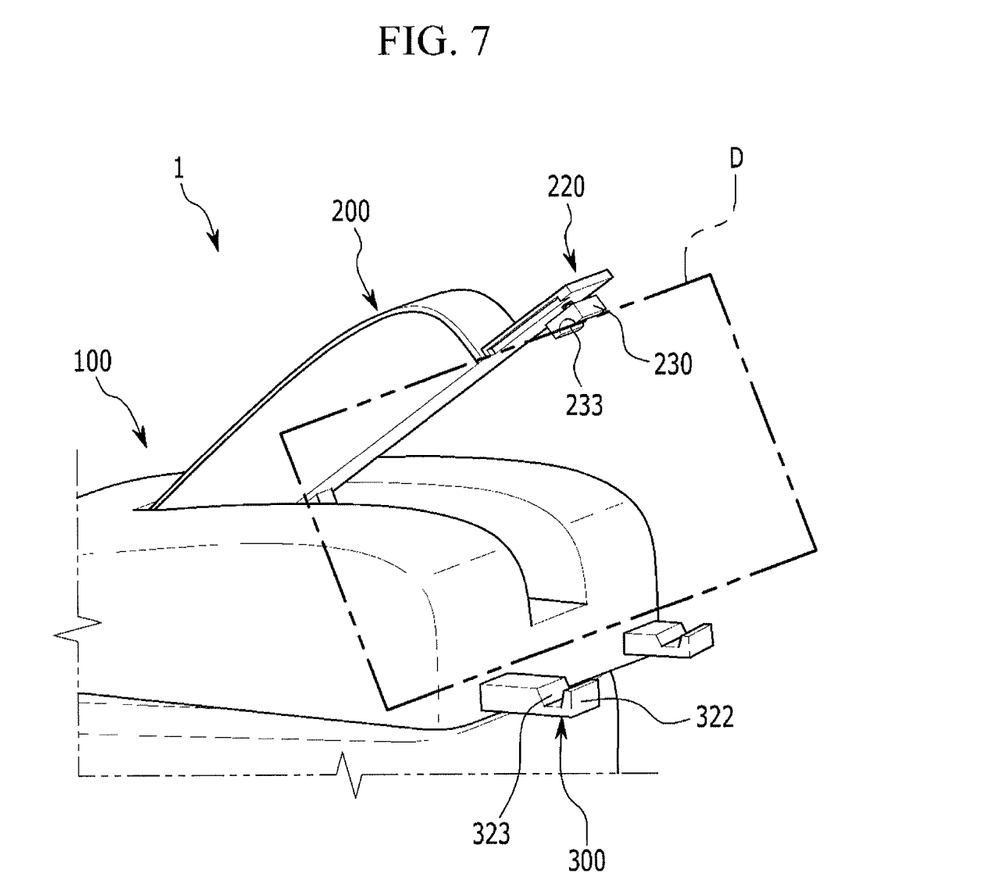

FIGS. 5 to 7 show an operating process of the console armrest for vehicle according to various embodiments of the present invention.

Firstly, referring to FIG. 5, if the display device D is not assembled to the console armrest 1 for a vehicle, the upper support device 200 is inserted into the receiving groove 110 which is formed at the cover device 100, and the lower support device 300 is in a state of being inserted into the inside of the cover device 100.

Then, referring to FIG. 2 and FIG. 6, when the upper support device 200 of the cover device 100 is lifted, the upper support device 200 is rotated around the first rotation shaft A1.

As described above, when the upper support device 200 is rotated upward, the cover device gear 400 which is engaged with the first interlocking gear 251 is rotated in a clockwise direction with reference to the third rotation shaft A3.

The lower support device 300 may be slid into a rear side of the cover device 100 by rotating of the cover device gear 400 which is engaged with the second interlocking gear 251. Thereby, an end portion of the lower hold device 322 of the lower support device 300 is protruded to an exterior of the cover device 100 through the sliding hole 120.

At this time, the lower hold groove 323 which is formed to be close to the end of the lower hold device 322 is also protruded to the exterior.

Next, referring to FIG. 2 and FIG. 7, in a state that the user lifts the upper support device 200 up as much as a predetermined angle that the user intends, the sliding bracket 220 may be slid from the upper support device body 210 to the exterior.

If the sliding bracket 220 is slid to the exterior, the support space S may be formed between the lower hold device 322 and the upper hold portion 230 which is formed at the other side of the sliding bracket 220.

When the portable display device D is inserted to the support space S, then a portion of an upper circumference thereof is inserted into the upper hold groove 233 and a portion of a lower circumference thereof is inserted into the lower hold groove 323, thereby the portable device D may be safely fixed and used.

Herein, the rotation shaft elastic member 241 provides elastic force to the support device 200 to be pressed downward. By the elastic force, the portable display D is pressed from the upper hold groove 233 to the lower hold groove 323, and the portable display device D may be firmly fixed.

Figure 8:
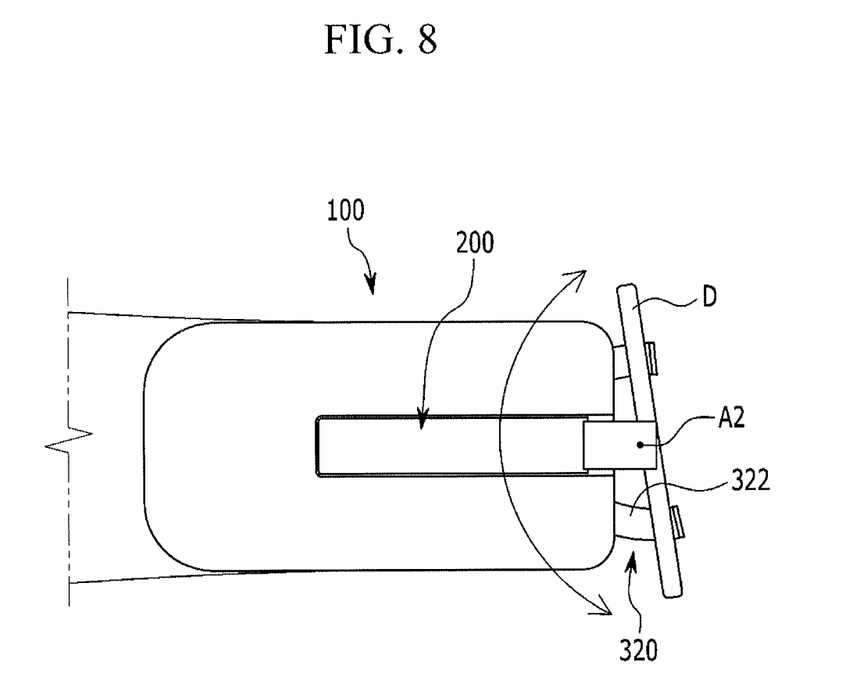
FIG. 8 is a top plan view of the exemplary console armrest for vehicle according to the present invention.

FIG. 8 is a top plan view of the console armrest for vehicle according to various embodiments of the present invention.

Referring to FIG. 8, in a state that a portion of circumference of the display D is inserted into the lower hold groove 323, the lower hold portion 320 may be rotated around the second rotation shaft A2. Therefore, the console armrest 1 may perform a swiveling operation such that the portable display device D is rotated toward a left or right side.

Figure 9:
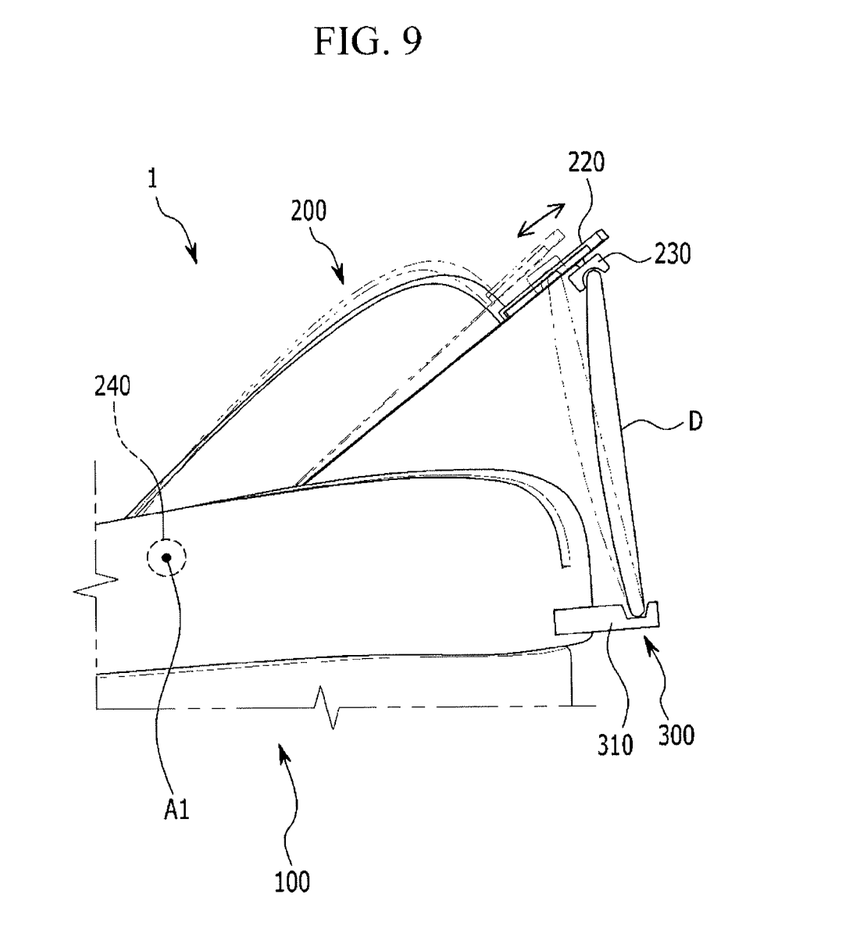
FIG. 9 is a side view of the exemplary console armrest for vehicle according to the present invention.

FIG. 9 is a side view of the console armrest for vehicle according to various embodiments of the present invention.

Referring to FIG. 9, the console armrest 1 according to various embodiments may perform a tilting operation since the portable display device D is rotated up and down by controlling a rotation angle of the upper support device 200 and a length of being drawn out of the sliding bracket 220.

According to the various embodiments, when the user views an image on the portable display device in the vehicle, the portable display device is conveniently assembled to the vehicle.

In addition, when the portable device is not held, a structure for holding the portable device may be put in the armrest. Thus, a sense of beauty of the inside of vehicle is improved.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A console armrest for a vehicle, comprising:
   a cover device configured to selectively cover a console box and coupled to the console box to be rotatable;
   an upper support device connected to the cover device to be rotatable in an up and down direction of the vehicle;
   a lower support device configured to be drawn out from the cover device to a rear side,
   wherein when the lower support device is drawn out from the cover device, a support space is formed between the lower support device and the cover device,
   a first interlocking gear provided to the upper support device and formed in a rotation direction of the upper support device;
   a second interlocking gear provided to the lower support device and formed in a direction in which the lower support device is drawn out; and
   a cover device gear engaged to the first interlocking gear and the second interlocking gear together and configured to actuate the first interlocking gear and the second interlocking gear.

2. The console armrest for the vehicle of claim 1, wherein a portion of the lower support device being drawn out from the cover device corresponds to a rotation amount of the upper support device.

3. The console armrest for the vehicle of claim 1, wherein the upper support device comprises a first interlocking bracket extended downward and provided with the first interlocking gear at one side surface thereof, and
   the lower support device comprises a second interlocking bracket which is extended in a length direction of the vehicle and is provided with the second interlocking gear at one side surface thereof.

4. The console armrest for the vehicle of claim 3, wherein the first interlocking bracket is formed in an arc shape rounded with reference to the rotation center of the upper support device.

5. The console armrest for the vehicle of claim 3,
   wherein the second interlocking bracket comprises a pair of interlocking brackets, and
   wherein a portion of the first interlocking bracket is disposed between the pair of second interlocking brackets.

6. The console armrest for the vehicle of claim 1, wherein the upper support device comprises:
   an upper support device body configured to seat on a receiving groove formed at an upper surface of the cover device as one side end thereof is rotatably connected to the cover device;
   a sliding bracket configured to be drawn out from the upper support device body; and
   an upper hold portion rotatably connected to an end portion of the sliding bracket and provided with an upper hold groove which faces downward.

7. The console armrest for the vehicle of claim 6, wherein a receiving space is hollowly formed at a lower surface of the upper support device body such that the sliding bracket is inserted therein and drawn out therefrom, and
   the receiving space is formed from a front side to a rear side end at a lower surface of the upper support device body.

8. The console armrest for the vehicle of claim 7, wherein a sliding rail protrudes from left and right sides of the receiving space to inside of the receiving space and the sliding rail is extended in the length direction of the upper support device body,
   wherein a sliding groove configured to guide the sliding rail is disposed at left and right surfaces of the sliding bracket, and
   wherein a stopper is disposed at an end portion of the sliding groove.

9. The console armrest for the vehicle of claim 6, wherein the sliding bracket comprises:

a locking portion having a plurality of blockers formed thereon; and a locking elastic member formed such that a first side thereof is fixed to the upper cover device body and a second side is configured to be hooked by at least one of the blockers.

10. The console armrest for the vehicle of claim 6, wherein the upper hold portion comprises a connection bracket which is formed in a sphere shape, and an insertion hole is formed at the sliding bracket to insert a portion of the connection bracket therein to be rotatable with reference to the sliding bracket.

11. The console armrest for the vehicle of claim 6, the upper support device comprises:

a rotation shaft disposed at one side of the upper support device body and connected to the upper support device such that the upper support device rotates about the cover device; and a rotation shaft elastic member disposed at a radially outer portion of the rotation shaft and configured to apply elastic force such that the upper support device body is moved to the receiving groove of the cover device.

12. The console armrest for the vehicle of claim 1, wherein the lower support device comprises:

a lower support device body to slide in the cover device; and a lower hold portion connected to the lower support device body in order to rotate with reference to a rotation shaft which is orthogonal to a direction in which the lower support device is sliding.

13. The console armrest for the vehicle of claim 12, wherein the lower hold portion comprises:

a lower hold portion frame connected to the lower support device body and rounded such that both ends thereof face rearward; and a lower hold device which is disposed at both ends of the lower hold portion frame and provided with a lower hold groove which faces upward and is configured to selectively protrude to an outside of the cover device through a pair of sliding holes which are disposed at the cover device.

14. The console armrest for the vehicle of claim 12, wherein the lower support device body comprises:

a lower support device gear configured to rotate about the second rotation shaft, and a frame gear is engaged to the lower support device gear and formed at one surface of the lower hold portion frame.

15. The console armrest for the vehicle of claim 1, wherein the upper support device is provided in order to selectively seat on a receiving groove formed at an upper surface of the cover device, and the lower support device is selectively and completely inserted into an inside of the cover device.

\* \* \* \* \*